United States Patent
Jiang et al.

(10) Patent No.: US 12,380,365 B2
(45) Date of Patent: Aug. 5, 2025

(54) METHOD FOR DETECTING THE LOAD MASS OF COMMERCIAL VEHICLE

(71) Applicants: Zhejiang Feidi Motors Co., Ltd, Zhejiang (CN); Shandong Wuzheng Group Co., Ltd., Shandong (CN)

(72) Inventors: Wenjuan Jiang, Shandong (CN); Zhen Cui, Shandong (CN); Licheng Xu, Shandong (CN); Guibao Cao, Shandong (CN); Huiyi Wang, Shandong (CN); Minghua Zhang, Shandong (CN); Dongtao Lu, Shandong (CN)

(73) Assignees: Zhejiang Feidi Motors Co., Ltd, Hangzhou (CN); Shandong Wuzheng Group Co., Ltd., Rizhao (CN)

( * ) Notice: Subject to any disclaimer, the term of this patent is extended or adjusted under 35 U.S.C. 154(b) by 931 days.

(21) Appl. No.: 17/530,433

(22) Filed: Nov. 18, 2021

(65) Prior Publication Data
US 2023/0130765 A1    Apr. 27, 2023

(30) Foreign Application Priority Data
Oct. 21, 2021    (CN) .......................... 202111226034.9

(51) Int. Cl.
*G06N 20/00*    (2019.01)

(52) U.S. Cl.
CPC .................................... *G06N 20/00* (2019.01)

(58) Field of Classification Search
CPC .......... G06N 20/00; G06N 5/01; G06N 20/20; B60W 2510/0657; B60W 2520/10;
(Continued)

(56) References Cited

U.S. PATENT DOCUMENTS

2021/0209099 A1*    7/2021    Marsden ............. G06F 16/2465

FOREIGN PATENT DOCUMENTS

| CN | 109255094 A | 1/2019 |
|----|-------------|--------|
| CN | 112766771 A | 5/2021 |

(Continued)

OTHER PUBLICATIONS

English machine translation of Yoshiura et al. (JP2021 018627 A) (Year: 2021).*

(Continued)

*Primary Examiner* — Walter L Lindsay, Jr.
*Assistant Examiner* — Geoffrey T Evans

(57) ABSTRACT

A method for detecting the load mass of a commercial vehicle includes the following steps. Step S1, data preprocessing: including data analysis, cleaning, noise processing and other operations for original terminal data of the vehicle. Step S2, identification and analysis of working conditions: further analyzing the working conditions according to the preprocessed data. Step S3, data screening: determining whether data with the working conditions analyzed belong to test data or training data; proceeding to step S5 if the data belong to test data, or proceeding to step S4 if the data belong to training data. Step S4, model construction and combination: constructing a plurality of different basic models through the training data in the step S2, and finally combining the models through training and screening.

8 Claims, 4 Drawing Sheets

(58) Field of Classification Search
CPC . B60W 2520/105; B60W 40/13; G06F 30/27; G06F 17/18; G06F 2119/14; G06F 18/214; G06F 18/2433; G06F 18/25
See application file for complete search history.

(56) References Cited

FOREIGN PATENT DOCUMENTS

| | | | | | |
|---|---|---|---|---|---|
| CN | 113421402 A | * | 9/2021 | | |
| JP | 2021018627 A | * | 2/2021 | ........... | G05B 13/027 |

OTHER PUBLICATIONS

English machine translation of Zeng et al. (CN113421402A) (Year: 2021).*

* cited by examiner

METHOD FOR DETECTING THE LOAD MASS OF COMMERCIAL VEHICLE

CROSS REFERENCE TO RELATED APPLICATIONS

The present application claims the benefit of Chinese Patent Application No. 202111226034.9 filed on Oct. 21, 2021, the contents of which are incorporated herein by reference in their entirety.

TECHNICAL FIELD

The present invention belongs to the technical field of intelligent Internet of Vehicles and logistic transportation and in particular to a method for detecting the load mass of a commercial vehicle.

BACKGROUND

Vehicle load mass of commercial vehicles has a great impact on energy consumption and vehicle loss, and serious overload is a great potential safety hazard. With intelligent development of existing vehicles, the vehicle load mass is the basic data for some new technology applications. How to detect load mass of customers' vehicles in real time is a problem faced by all automobile enterprises at present, and also a problem faced by the nation at the overload control level.

There are currently four principles and methods for real-time monitoring of load mass in the market, i.e., principle of strain, principle of displacement, principle of pneumatics, and principle of dynamics. Currently, some measuring devices are mounted on vehicles for data acquisition, but additional hardware sensors are required, such that costs are high, subsequent maintenance costs are also high and the measurement accuracy will be affected. Based on the principle of dynamics, such method is a hot spot and trend in recent years due to characteristics of high accuracy, dynamic measurement and long life cycle.

However, for methods based on the principle of dynamics, a single model prediction method is applied to all existing solutions, which brings problems that the accuracy of model prediction results is very unstable, and it is difficult to apply to scenarios with relatively strict load prediction.

SUMMARY OF THE INVENTION

The present invention provides a method for detecting the load mass of a commercial vehicle, which solves the problems presented in the background.

In order to achieve the purpose, the technical solution adopted by the present invention is as follows: a method for detecting the load mass of a commercial vehicle, comprising the following steps:

Step S1, data preprocessing, comprising data analysis, cleaning, noise processing and other operations for original terminal data of the vehicle;

Step S2, identification and analysis of working conditions: further analyzing the working conditions according to the preprocessed data;

Step S3, data screening: determining that data with the working conditions analyzed belong to test data or training data, proceeding to step S5 if the data belong to test data, and proceeding to step S4 if the data belong to training data;

Step S4, model construction and combination: constructing a plurality of different basic models through the training data in the step S2, and finally combining the models through training and screening; and Step S5, model service deployment: deploying the trained model to a cloud server, constructing a Docker image by using a model generated through training and model service-oriented codes, and pushing the Docker image to a Docker image repository of the Internet of Vehicles.

Preferably, the step S1 comprises the following steps.

Step S11, data analysis: analyzing the original terminal data of the vehicle to analyze data of the vehicle required for modeling;

Step S12, data filtering: carrying out filling, alignment, interpolation data smoothing and other operations for the analyzed data, and determining whether the data conform to principle of dynamics according to clutch brake and other conditions. If so, proceeding to step S13; if not, sending the data back to an original terminal of the vehicle;

Step S13, anomaly detection: determining whether the data belong to abnormal data. If so, proceeding to S14; if not, sending the data back to the original terminal of the vehicle, wherein the detection method is as follows:

I. Rule-based judgment mainly based on practical consequence of each attribute, for example, speed cannot be negative and torque cannot exceed a certain range;

II. Rejection of abnormal samples through an isolated forest model commonly used in model algorithm anomaly detection, and filtering based on center point crest; and S14, gear shift detection: determining whether the data belong to abnormal data according to influencing factors on the load mass as analyzed in a dynamic formula, if so, proceeding to S2, and if not, sending the data back to the original terminal of the vehicle.

Preferably, the step S2 comprises the following steps.

Step S21, setting conditions for filtering working conditions, torque output percentage being greater than 10%, engine speed being greater than idle speed, and brake signal being 0;

Step S22, generating time periods for various defined working conditions, screening and filtering according to acceleration to identify acceleration and deceleration time periods, and identifying clutch-stepping time periods according to clutch signals; and Step S23, combining time of various working conditions, selecting valid time of working conditions, and selecting time periods for basic working conditions conforming to the principle of dynamics without stepping on a clutch and a brake under working condition filter conditions as preliminary input data for the next step of model construction.

Preferably, the step S4 comprises the following steps.

Step S41, model construction: constructing a plurality of different basic models through the training data in the step S2;

Step S42, model training: training a selected basic regression model based on a prepared model training sample set, optimizing and selecting model parameters to generate a plurality of basic vehicle mass prediction models, and then carrying out performance evaluation on trained vehicle mass prediction models by testing the sample set for load evaluation models;

Step S43, model screening, determining whether the obtained models meet combination requirements, if so, proceeding to S44, and if not, repeating the step S42; and Step S44, model combination, combining the obtained plurality of better models.

Preferably, in the step S41, several different basic models are constructed in the following ways.

1). Gear filtering; and
2). Triangular domain transform data filtering.

Preferably, the gear filtering is designed as follows.

1) Counting vehicle speed-to-engine speed ratio distribution density;
2) Carrying out peak detection by using a distribution density map, the position at which the peak is located being the center point at which the vehicle speed-to-engine speed ratio for each gear is located;
3) Outputting peak width while carrying out peak detection to obtain upper and lower boundaries of the peak width, i.e., upper and lower boundaries of the vehicle speed-to-engine speed ratio for each gear; and
4) Filtering data according to the upper and lower boundaries of the vehicle speed-to-engine speed ratio, data within the upper and lower boundaries being retained, while data beyond the upper and lower boundaries being filtered.

Preferably, the triangular domain transform data filtering is designed as follows.

1) Calculating the ratio of torque to acceleration, and then solving for an arc tangent function thereof;
2) Counting kernel density distribution;
3) Detecting peak points and peak width by peak detection since a calculated ratio coefficient corresponding to a load certainly corresponds to a high distribution density in theory; and
4) Filtering data by using an upper boundary of the peak width.

Preferably, the model screening in the step S43 is as follows.

1) Calculating slope for load-related characteristic moment and acceleration to obtain a coefficient C;
2) Rotating coordinate axes by using the coefficient C; and
3) Calculating univariate 1X standard deviation for newly generated coordinates X and Y respectively, and dividing 1X standard deviation of Y by 1X standard deviation of X to obtain XYscore.

Preferably, a specific implementation algorithm for the XYscore is as follows.

1) Calculating an intermediate coefficient (coef) for input data (DF0, DF20) of each constructed basic model;
2) Calculating new coordinate axes by using the coefficient (coef) according to the following formulas:

$$X = \cos(\arc\tan(coef)) * DF0 + \sin(\arc\tan(coef)) * DF20;$$

$$Y = \cos(\arc\tan(coef)) * DF20 - \sin(\arc\tan(coef)) * DF0$$

3) Calculating the univariate 1X standard deviation for the new coordinates X and Y respectively, and dividing the 1X standard deviation of Y by the 1X standard deviation of X to obtain the XYscore.

Preferably, principle basis involved in the solution is based on a dynamic formula.

$$F_t = F_f + F_w + F_i + F_j;$$

Where $F_t$ represents traction, $F_f$ represents rolling resistance, $F_w$ represents air drag, $F_i$ represents grade resistance and $F_j$ represents inertia force, and the formula can be approximately expanded as:

$$\eta \frac{T_{tq} n t}{v} = mgf + \frac{1}{2} C_D A \rho v^2 + mgi + ma_v + \frac{I_w}{r^2} a_v + a_v I_f \eta \left(\frac{nt}{v}\right)^2$$

Where f is rolling resistance coefficient, g is acceleration of gravity, $C_D$ is air drag coefficient, A is frontal area, ρ is air density, m is load mass, $T_{tq}$ is engine torque, i is transmission ratio, n is engine speed, $a_v$ is acceleration, $I_w$ is moment of Inertia, $I_f$ is rotational inertia of flywheel, η is efficiency and t is constant;

The formula can be approximately sorted out and expressed as follows to obtain a reference principle equation for modeling:

$$(e + a_v)m = a\frac{T_{tq} n}{v} + bv^2 + ca_v + d\frac{a_v n^2}{v^2};$$

a, b, c, d and e here are all constants, where speed, torque and acceleration can be derived from original data.

The technical solution has the following advantageous effects: a multi-AI algorithm model screening and combination method is designed and implemented based on the advantages of a big data platform for Internet of vehicles and the principle of dynamics in the present invention. In addition, a new model selection algorithm is proposed in the solution to select high-quality models for combination, and a model is constructed by analyzing massive historical data, thereby achieving real-time monitoring of load mass of the commercial vehicle without additional hardware, which ensures the accuracy of results while reducing the instability of the results caused by random factors of statistical data of the models.

DETAILED DESCRIPTION OF THE PREFERRED EMBODIMENTS

The specific implementation of the present invention will be further described in detail with reference to the accompanying drawings and description of the embodiments, for the purpose of helping those skilled in the art to have a more complete, accurate and in-depth understanding of the concept and technical solutions of the present invention, and facilitate the implementation thereof.

Figure 1:
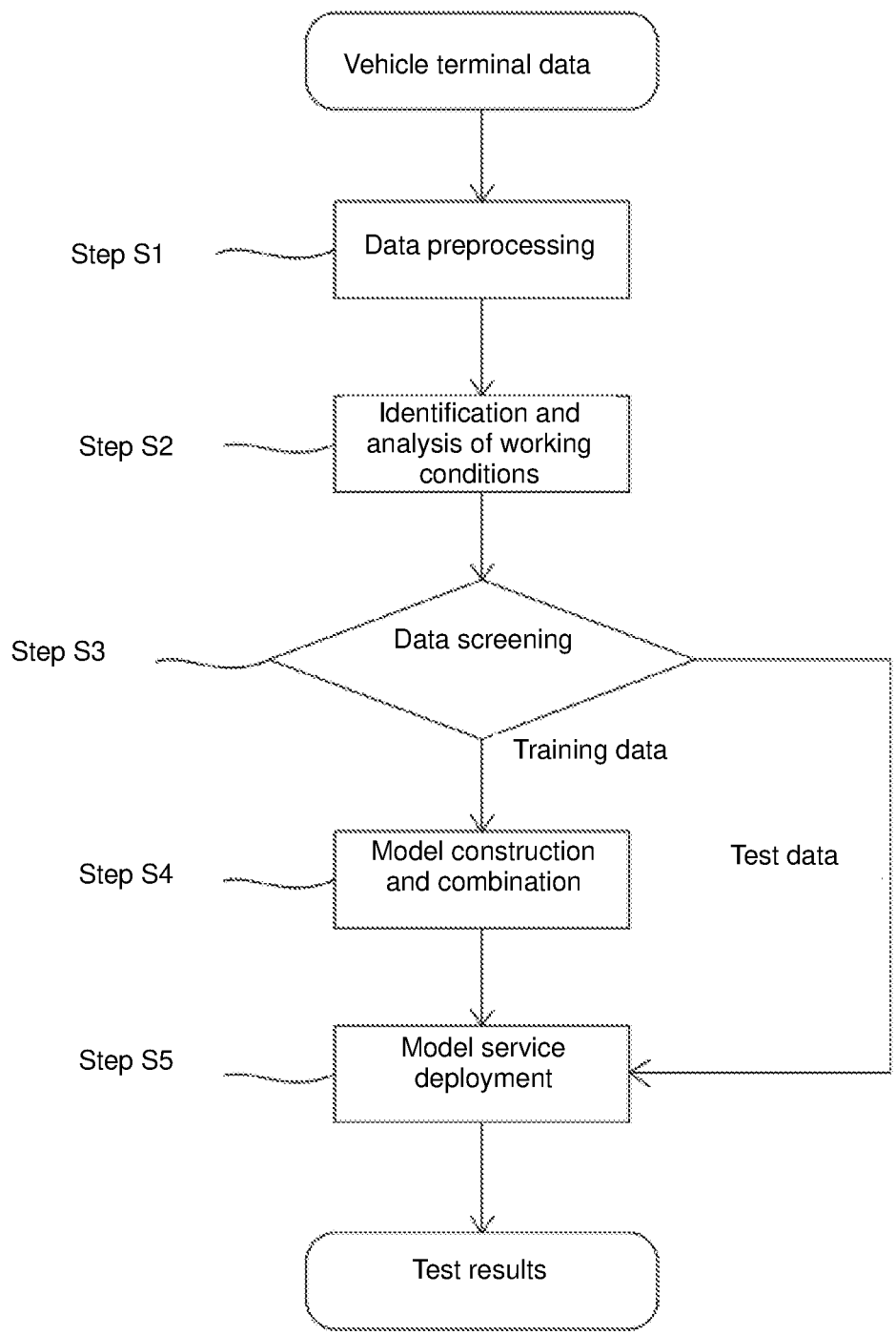
FIG. 1 is a flowchart of a method for detecting load mass according to the present invention.

Embodiment 1, as Shown in FIG. 1:

According to the present invention, a multi-AI algorithm model screening and combination method is designed and implemented based on the principle of dynamics. In addition, a new model selection algorithm is proposed in the solution to select high-quality models for combination, and a model is constructed by analyzing massive historical data, thereby achieving real-time monitoring of load mass of the commercial vehicle without additional hardware, which ensures the accuracy of results while reducing the instability of the results caused by random factors of statistical data of the models.

Figure 2:
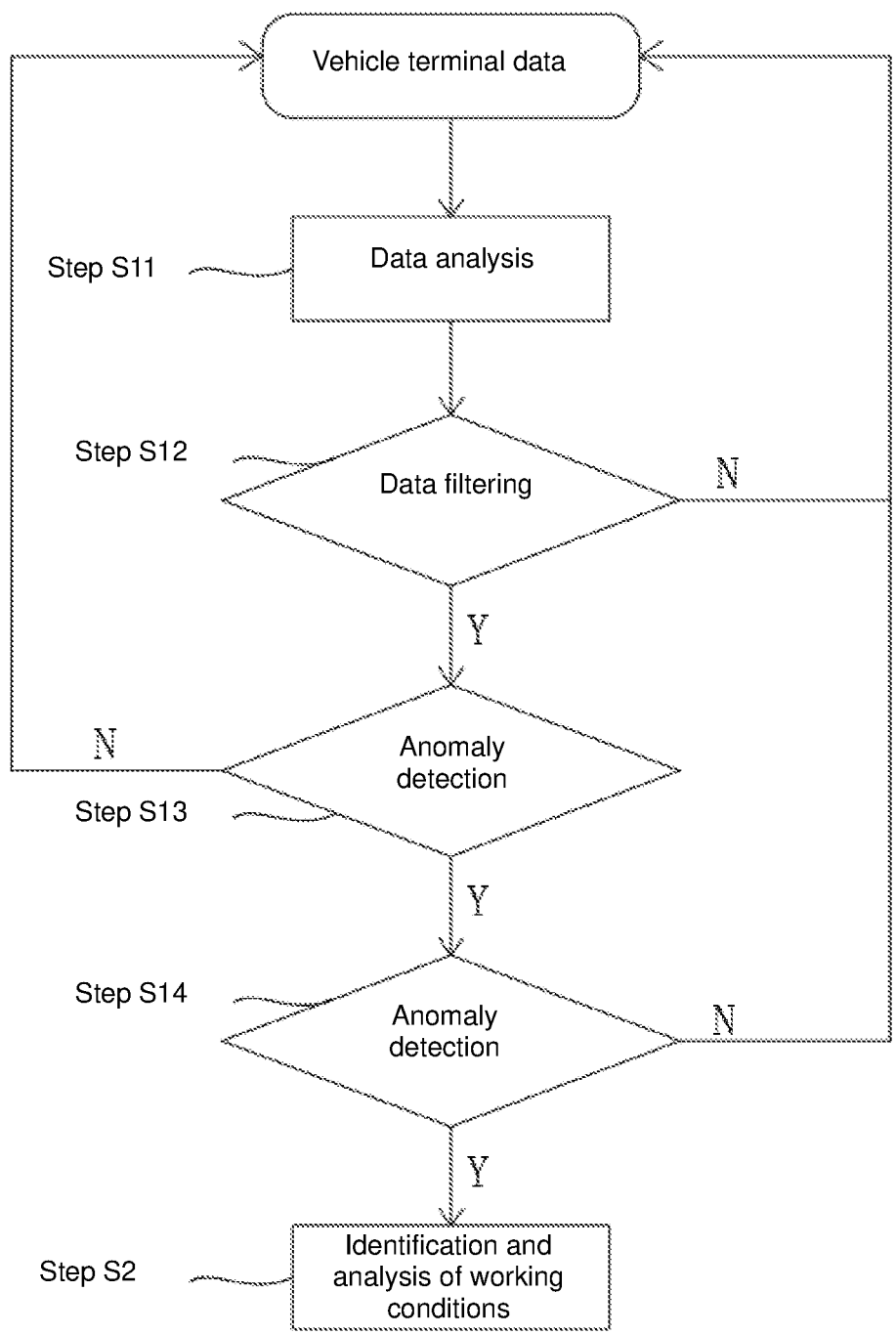
FIG. 2 is a flowchart of data preprocessing.

Embodiment 2, as Shown in FIG. 2:

On the basis of Embodiment 1, since the data are original message data sent by a vehicle-mounted terminal, it is necessary to analyze the message data to obtain the vehicle data required for modeling, carry out filling, alignment, interpolation data smoothing and other operations for the analyzed data, preliminarily filter out data that do not conform to the principle of dynamics according to clutch brake and other conditions, and design a recognition and filtering module for data anomalies. The module works mainly in two ways: one is rule-based judgment mainly according to practical consequence of each attribute, for example, speed cannot be negative and torque cannot exceed a certain range; and the other is rejection of abnormal samples through an isolated forest model commonly used in model algorithm anomaly detection, and filtering based on center point crest. In both cases, data anomalies are filtered from single attribute dimensions and overall sample dimensions respectively, and then characteristic values are derived according to influencing factors on load mass as analyzed in the dynamic formula to generate fields needed for modeling. Because gear shift operation has a significant impact on the data, identification and removal are carried out for the gear shift operation.

Figure 3:
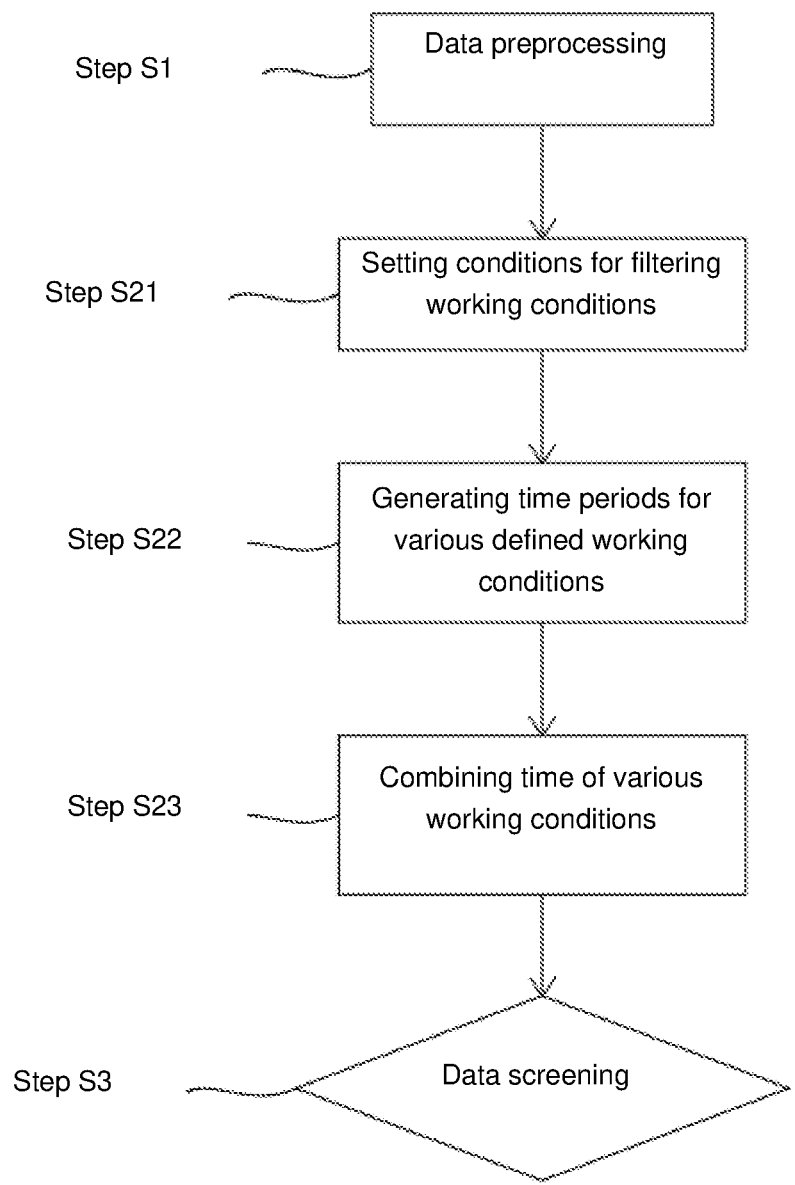
FIG. 3 is an assembly diagram for identification and analysis of working conditions.

Embodiment 3, as Shown in FIG. 3:

On the basis of Embodiment 1, linear regression is the most common learning algorithm used for selecting basic models, because many advantages of linear models are well known. Calculation costs involved in fitting these models are usually moderate and always predictable, usually requiring minimal tuning, and the form of expression is naturally helpful for explanation. Therefore, a regression algorithm in a Sklearn toolbox is adopted in the solution to achieve basic algorithm models, comprising LinearRegression, RANSACRegressor, Ridge, Huber and TheilSen.

After the basic models are selected, modeling is carried out for each basic model, and the training data are processed and divided in different ways mainly for driving data after gear filtering, data after gear filtering and working condition filtering, data after gear filtering and triangular domain transform filtering, data after gear filtering, working condition filtering and triangular domain transform filtering, and data divided under different working conditions to construct different basic models for training, respectively.

Figure 4:
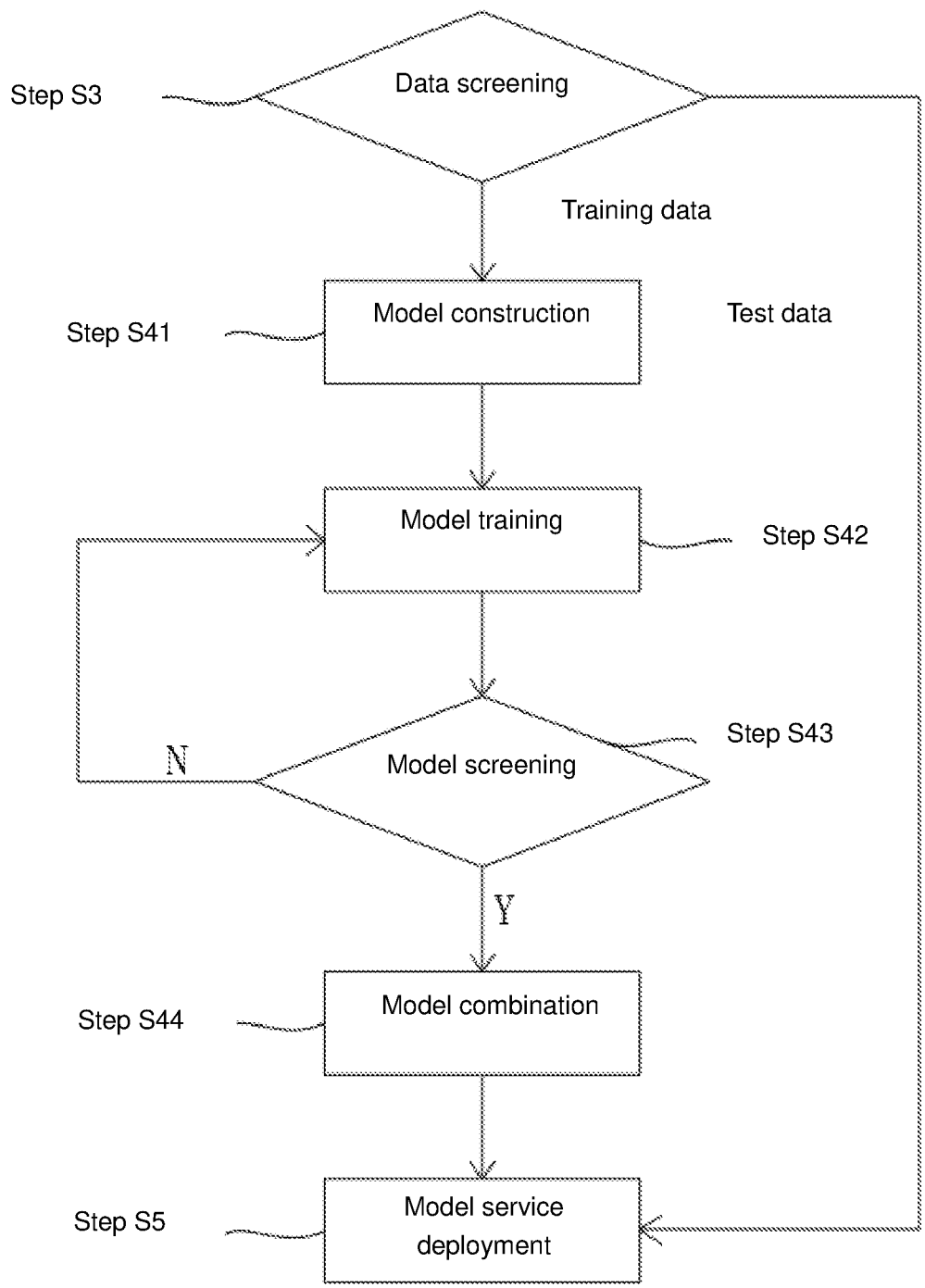
FIG. 4 is a flowchart of model construction and combination.

Embodiment 4, as Shown in FIG. 4:

On the basis of Embodiment 1, data in the solution are divided into five types, and five selected basic models are constructed respectively before going to the next step of model training. The basic models are specifically constructed as follows:

Model 1: input data: data (DF0, DF20) after gear filtering, basic model: LinearRegression;

Model 2: input data: data (DF0, DF20) after gear filtering and working condition filtering, basic model: RANSACRegressor;

Model 3: input data: data (DF0, DF20) after gear filtering and triangular domain transform filtering, basic model: Ridge;

Model 4: input data: data (DF0, DF20) after gear filtering, working condition filtering and triangular domain transform filtering, basic model: TheilSen; and Model 5: input data: data (DF0, DF20) after triangular domain transform filtering, basic model: Huber.

Embodiment 5, as Shown in FIG. 4:

On the basis of Embodiment 4, five basic models are constructed for training and parameter tuning, respectively.

Real load data should be available in the training stage, and each basic model is trained in the following steps:

1. The data (DF0, DF20) filtered according to different filtering conditions in the previous step are input into the regression model RANSACRegressor to fit the relationship between DF0 and DF20 to obtain an intermediate coefficient (coef);

2. The intermediate coefficient (coef) is then integrated with the real load data (coef, load) to generate data input into the basic models for training each basic model selected in the previous step;

3. During training of the models, model parameters are optimized and selected to generate a basic prediction model. Then, performance evaluation is carried out on a trained vehicle mass prediction model by testing a sample set. For a load evaluation model, because the output of the model is a numerical value, i.e., a common regression problem, some indicators commonly used in machine learning regression models, such as MAPE, MAE and R2, can be used. In the solution, the MAPE is used herein as a main evaluation criterion to continuously guide iterative training for the models through evaluation indicators until model training is completed.

4. After the training, a load prediction model is output to predict unknown data and output a predicted load value.

Finally, better models can be selected from multiple models based on the XYscore algorithm for final model combination. The higher the XYscore of the rating mechanism is, the better the model performance is.

Several basic models generated during calculation are screened by the XYscore. A higher score represents better model performance, top-n of the basic models is selected for final model combination, and n=2 is set in the solution.

The present invention is herein described by way of examples with reference to the accompanying drawings. Obviously, the specific implementation of the present invention is not limited by the above-mentioned methods, and all non-substantive improvements made by using the method concept and technical solutions of the present invention, or direct application of the above concept and technical solutions of the present invention to other occasions without improvement, are all within the protection scope of the present invention.

What is claimed is:

1. A method for detecting the load mass of a commercial vehicle, comprising the following steps:
    step S1, data preprocessing, comprising data analysis, cleaning, noise processing for original terminal data of the vehicle;
    step S2, identification and analysis of working conditions: further analyzing the working conditions according to the preprocessed data;
    step S3, data screening: determining that data with the working conditions analyzed belong to test data or training data, proceeding to step S5 if the data belong to test data, and proceeding to step S4 if the data belong to training data;
    step S4, model construction and combination: constructing a plurality of different basic models through the training data in the step S3, and finally combining the models through training and screening, wherein the step S4 comprises the following steps:
    step S41, model construction: constructing a plurality of different basic models through the training data in the step S3;
    step S42, model training: training a selected basic regression model based on a prepared model training sample set, optimizing and selecting model parameters to generate a plurality of basic vehicle mass prediction models, and then carrying out performance evaluation on trained vehicle mass prediction models by testing the sample set for load evaluation models;

step S43, model screening, determining whether the obtained models meet combination requirements, if so, proceeding to S44, and if not, repeating the step S42; and step S44, model combination, combining the obtained plurality of better models; and step S5, model service deployment: in response to that a model has been trained, deploying the trained model to a cloud server, constructing a Docker image by using a model generated through training and model service-oriented codes, and pushing the Docker image to a Docker image repository of the Internet of Vehicles, and using the test data to perform detection of the load mass of a commercial vehicle through the deployed model.

2. The method for detecting the load mass of a commercial vehicle according to claim 1, wherein the step S1 comprises the following steps:

step S11, data analysis: analyzing the original terminal data of the vehicle to analyze data of the vehicle required for modeling;

step S12, data filtering: carrying out filling, alignment, interpolation data smoothing for the analyzed data, and determining whether the data conform to principle of dynamics according to clutch brake, if so, proceeding to step S13; if not, sending the data back to an original terminal of the vehicle;

step S13, anomaly detection: determining whether the data belong to abnormal data, if so, proceeding to S14; if not, sending the data back to the original terminal of the vehicle, wherein the detection method is as follows:

I) rule-based judgment based on practical consequence of each attribute, the rule including: speed cannot be negative and torque cannot exceed a certain range;

II) rejection of abnormal samples through an isolated forest model commonly used in model algorithm anomaly detection, and filtering based on center point crest; and S14, gear shift detection: determining whether the data belong to abnormal data according to influencing factors on the load mass as analyzed in a dynamic formula, if so, proceeding to S2, and if not, sending the data back to the original terminal of the vehicle.

3. The method for detecting the load mass of a commercial vehicle according to claim 1, wherein the step S2 comprises the following steps:

step S21, setting conditions for filtering working conditions, torque output percentage being greater than 10%, engine speed being greater than idle speed, and brake signal being 0;

step S22, generating time periods for various defined working conditions, screening and filtering according to acceleration to identify acceleration and deceleration time periods, and identifying clutch-stepping time periods according to clutch signals; and step S23, combining time of various working conditions, selecting valid time of working conditions, and selecting time periods for basic working conditions conforming to the principle of dynamics without stepping on a clutch and a brake under working condition filter conditions as preliminary input data for the next step of model construction;

wherein the principle of dynamics is based on a dynamic formula:

$$F_t = F_f + F_w + F_i + F_j;$$

where $F_t$ represents traction, $F_f$ represents rolling resistance, $F_w$ represents air drag, $F_i$ represents grade resistance and $F_j$ represents inertia force, and the formula is expanded as:

$$\eta \frac{T_{tq} n t}{v} = mgf + \frac{1}{2}C_D A \rho v^2 + mgi + ma_v + \frac{I_w}{r^2}a_v + a_v I_f \eta \left(\frac{nt}{v}\right)^2$$

where f is rolling resistance coefficient, g is acceleration of gravity, $C_D$ is air drag coefficient, A is frontal area, $\rho$ is air density, m is load mass, $T_{tq}$ is engine torque, i is transmission ratio, n is engine speed, $a_v$ is acceleration, $I_w$ is moment of Inertia, $I_f$ is rotational inertia of flywheel, $\eta$ is efficiency and t is constant;

a reference principle equation for modeling is obtained from the expanded formula:

$$(e + a_v)m = a\frac{T_{tq} n}{v} + bv^2 + ca_v + d\frac{a_v n^2}{v^2};$$

a, b, c, d and e here are all constants, where speed, torque and acceleration are derived from the test for the commercial vehicle.

4. The method for detecting the load mass of a commercial vehicle according to claim 1, wherein the plurality of different basic models are constructed in the step S41 in the following ways:
1) gear filtering; and
2) triangular domain transform data filtering.

5. The method for detecting the load mass of a commercial vehicle according to claim 4, wherein the gear filtering is designed as follows:
1) counting vehicle speed-to-engine speed ratio distribution density;
2) carrying out peak detection by using a distribution density map, the position at which the peak is located being the center point at which the vehicle speed-to-engine speed ratio for each gear is located;
3) outputting peak width while carrying out peak detection to obtain upper and lower boundaries of the peak width, i.e., upper and lower boundaries of the vehicle speed-to-engine speed ratio for each gear; and
4) filtering data according to the upper and lower boundaries of the vehicle speed-to- engine speed ratio, data within the upper and lower boundaries being retained, while data beyond the upper and lower boundaries being filtered.

6. The method for detecting the load mass of a commercial vehicle according to claim 4, wherein the triangular domain transform data filtering is designed as follows:
1) calculating the ratio of torque to acceleration, and then solving for an arc tangent function thereof;
2) counting kernel density distribution;
3) detecting peak points and peak width by peak detection since a calculated ratio coefficient corresponding to a load certainly corresponds to a high distribution density in theory; and
4) filtering data by using an upper boundary of the peak width.

7. The method for detecting the load mass of a commercial vehicle according to claim 1, wherein the model screening in the step S43 is as follows:
   1) calculating slope for load-related characteristic moment and acceleration to obtain a coefficient C;
   2) rotating coordinate axes by using the coefficient C; and
   3) calculating univariate 1X standard deviation for newly generated coordinates X and Y respectively, and dividing 1X standard deviation of Y by 1X standard deviation of X to obtain XYscore.

8. The method for detecting the load mass of a commercial vehicle according to claim 7, wherein implementation for the XYscore is as follows:
   1) calculating an intermediate coefficient (coef) for input data (DF0, DF20) of each constructed basic model;
   2) calculating new coordinate axes by using the coefficient (coef) according to the following formulas:

$$X = \cos(\arctan(coef)) * DF0 + \sin(\arctan(coef)) * DF20;$$

$$Y = \cos(\arctan(coef)) * DF20 - \sin(\arctan(coef)) * DF0$$

3) calculating the univariate 1X standard deviation for the new coordinates X and Y respectively, and dividing the 1X standard deviation of Y by the 1X standard deviation of X to obtain the XYscore.

* * * * *